(12) United States Patent
Chang

(10) Patent No.: US 7,808,207 B1
(45) Date of Patent: Oct. 5, 2010

(54) RECHARGEABLE BATTERY ASSEMBLY AND POWER SYSTEM USING SAME

(76) Inventor: Chun-Chieh Chang, 2250 N. Triphammer Rd., H2E, Ithaca, NY (US) 14850

( * ) Notice: Subject to any disclaimer, the term of this patent is extended or adjusted under 35 U.S.C. 154(b) by 0 days.

(21) Appl. No.: 12/835,033

(22) Filed: Jul. 13, 2010

Related U.S. Application Data

(62) Division of application No. 11/805,786, filed on May 24, 2007.

(60) Provisional application No. 60/923,747, filed on Apr. 17, 2007, provisional application No. 60/930,646, filed on May 18, 2007, now abandoned.

(51) Int. Cl.
*H01M 10/46* (2006.01)
(52) U.S. Cl. ..................................... 320/117
(58) Field of Classification Search .............. 320/103, 320/107, 112, 114, 115, 116, 117, 118, 119, 320/134, 136; 429/96, 99, 100
See application file for complete search history.

(56) References Cited

U.S. PATENT DOCUMENTS

| | | | | |
|---|---|---|---|---|
| 5,994,873 A * | 11/1999 | Shiojima | ..................... | 320/116 |
| 6,060,864 A * | 5/2000 | Ito et al. | ..................... | 320/136 |
| 6,064,178 A * | 5/2000 | Miller | ........................ | 320/117 |
| 6,461,764 B1* | 10/2002 | Nakamura | ................... | 429/170 |
| 6,812,671 B2* | 11/2004 | Formenti et al. | ............ | 320/119 |
| 7,068,011 B2* | 6/2006 | Yang | ........................... | 320/116 |
| 2004/0209161 A1* | 10/2004 | Dubac et al. | ................. | 320/135 |
| 2005/0029986 A1* | 2/2005 | Morgan | ...................... | 320/118 |
| 2006/0186859 A1* | 8/2006 | Fujikawa et al. | ............ | 320/134 |
| 2006/0261784 A1* | 11/2006 | Kolb et al. | ................... | 320/166 |

* cited by examiner

*Primary Examiner*—Edward Tso
(74) *Attorney, Agent, or Firm*—Kratz, Quintos & Hanson, LLP

(57) ABSTRACT

A rechargeable battery, battery set or battery pack having a circuit or a plurality of circuits for providing self-discharging thereof electrically connected in parallel are used to form rechargeable battery assemblies and electric power supply systems for use in electric and hybrid vehicles and the like.

35 Claims, 18 Drawing Sheets

RECHARGEABLE BATTERY ASSEMBLY AND POWER SYSTEM USING SAME

This application is a Divisional Application of pending U.S. application Ser. No. 11/805,786 filed May 24, 2007, which claims priority of U.S. Provisional Application Ser. No. 60/923,747 filed Apr. 17, 2007 and Provisional Application Ser. No. 60/930,646 filed May 18, 2007 now abandoned.

FIELD OF INVENTION

The present invention is concerned with rechargeable batteries, and in particular with the recharging of rechargeable batteries.

BACKGROUND OF THE INVENTION

1. For batteries to be used for applications such as vehicle starter, electric bikes, electric motorcycles, electric or hybrid vehicles, etc, high voltage is essential owing to the increase of efficiency and the decrease of cost. The increase of voltage requires batteries to be connected in series.
2. Problems associated with batteries in series are:
    a. when one battery has a lower capacity, the capacity of the overall set of batteries is dictated by the capacity of the battery of lower capacity;
    b. if the battery possessing the lower capacity can not be charged to full capacity during charging, the performance of the entire battery set will be degraded owing to the lower capacity battery. This is known in the art as cell imbalance;
    c. the lower capacity of one specific battery can be caused by either high self discharge or defects during battery production.
3. Conventional ways to solve the cell imbalance problem are:
    a. sorting the batteries in order to avoid inconsistency of the batteries to be connected in series;
    b. charging the batteries separately (e.g. U.S. Pat. No. 6,586,909), in order to overcome the problems mentioned above, however, low voltage is required for charging each battery to full (for example, the lithium iron battery is charged to 3.65V) and this low voltage charging is not energy efficient owing to conversions from normal high voltage AC power source to low voltage DC power.

Most prior art systems and methods utilized in making the batteries balanced during charging use complicated circuitry to detect and balance the uncharged batteries (e.g. U.S. Pat. No. 7,068,011, U.S. Pat. No. 7,061,207, U.S. Pat. No. 6,882,129, U.S. Pat. No. 6,841,971, U.S. Pat. No. 6,825,638, U.S. Pat. No. 6,801,014, U.S. Pat. No. 6,784,638, U.S. Pat. No. 6,777,908, U.S. Pat. No. 6,700,350, U.S. Pat. No. 6,642,693, U.S. Pat. No. 6,586,909, U.S. Pat. No. 6,511,764, U.S. Pat. No. 6,271,645).

OBJECT OF THE INVENTION

It is an object of the present invention to provide a simple device and method for charging a plurality of batteries electrically connected in a series circuit.

SUMMARY OF THE INVENTION

The present invention is a rechargeable battery assembly, having a rechargeable battery with a positive terminal and a negative terminal, and means for self-discharging the rechargeable battery when a voltage across the terminals is greater or equal to a preset value. The means for self-discharging is electrically connected in parallel with the battery terminals

DESCRIPTION OF THE DRAWINGS

The invention will become more readily apparent from the following description thereof shown, by way of example only, in the accompanying drawings, wherein.

DETAILED DESCRIPTION OF THE INVENTION

The present invention is especially important for resolving the problems caused by batteries connected in series. A cell imbalance problem during charging can be alleviated by creating a device and methods that allows the leakage of current (energy) from the batteries being overcharged. Instead of using very expensive devices or ways to prevent overcharging, to achieve battery equalization, as found in prior art devices and methods, the present invention uses a method and device that reduces the current being provided to a battery in the series circuit that is being overcharged. Such method and device can be implemented for each battery or battery set or battery pack being connected in series. The terminology "battery set" used throughout the specification means a plurality of batteries connected in parallel, or series, or parallel-series, or series-parallel. The terminology "battery pack" used throughout the specification means a plurality of battery sets connected in parallel, or series, or parallel-series, or series-parallel. The terminology "assembly" used throughout the specification means a battery, a battery set, or a battery pack accompanied with a means for self-discharge of the battery(s), battery set or battery pack when the battery(s) is(are) being overcharged In the present invention a battery or batteries self-discharge when overcharged. Since each battery, battery set, or battery pack are provided with a "self-discharge" means, when voltage reaches a preset parameter during charging, or even after charging, a cell balance problem can be eliminated. This is the core idea of the present invention.

Figure 1A:
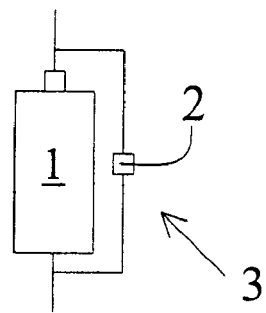
FIGS. 1a-e are schematic illustrations of various embodiments of battery assemblies of the invention.
Figure 1B:
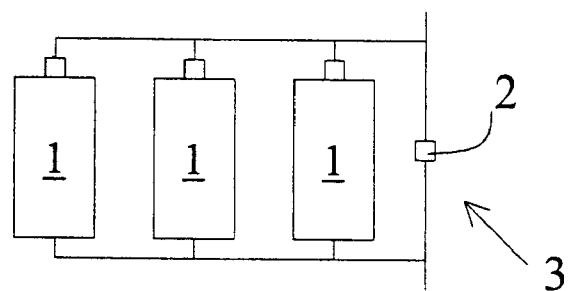
Figure 1C:
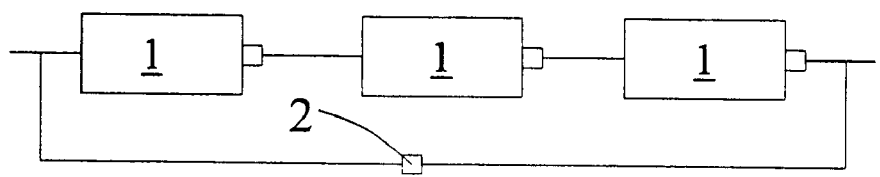
Figure 1D:
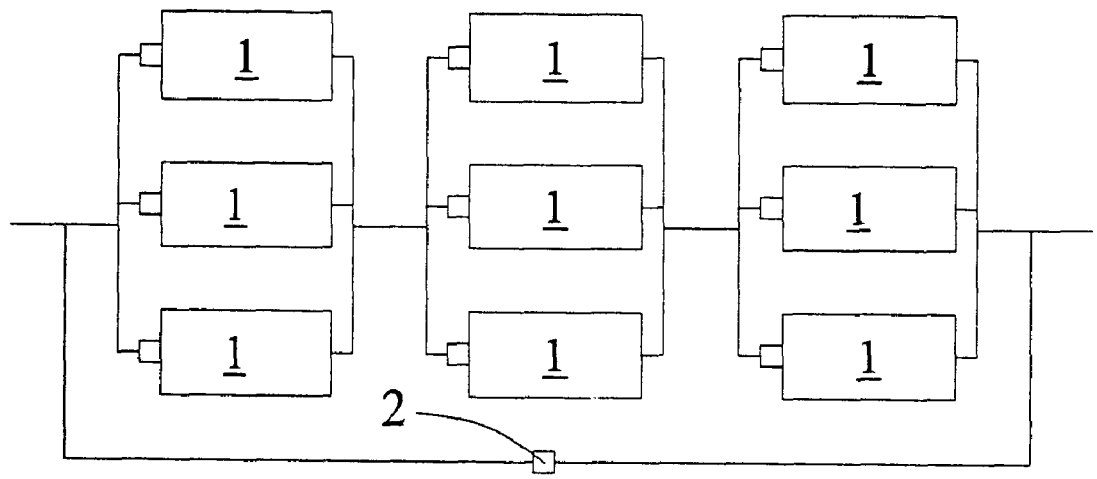
Figure 1E:
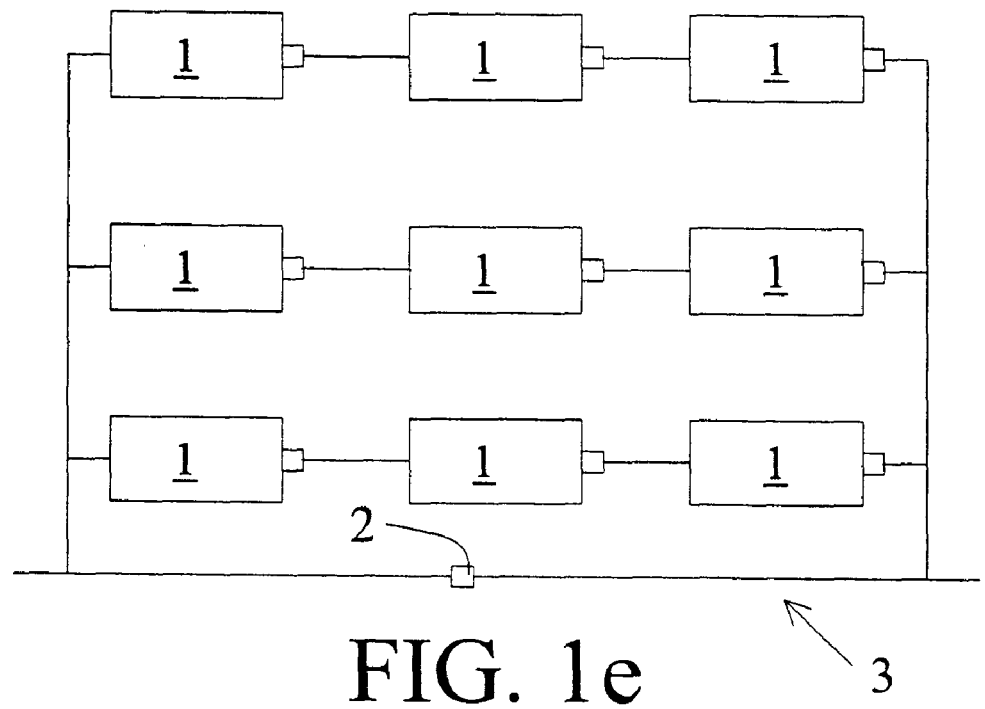

FIG. 1(a) shows the structure of a "battery assembly". FIG. 1(b) shows the structure of a "parallel battery set assembly"; FIG. 1(c) shows the structure of a "series battery set assembly"; FIG. 1(d) shows the structure of a "parallel-series battery set assembly"; and FIG. 1(e) shows the structure of a "series-parallel battery set assembly". These assemblies are the basic units for use in providing the battery pack. In these figures, as well as in the remaining figures, an individual rechargeable battery is indicated at 1, and a circuit for self-discharging the rechargeable battery(s) is indicated at 3.

Figure 2A:
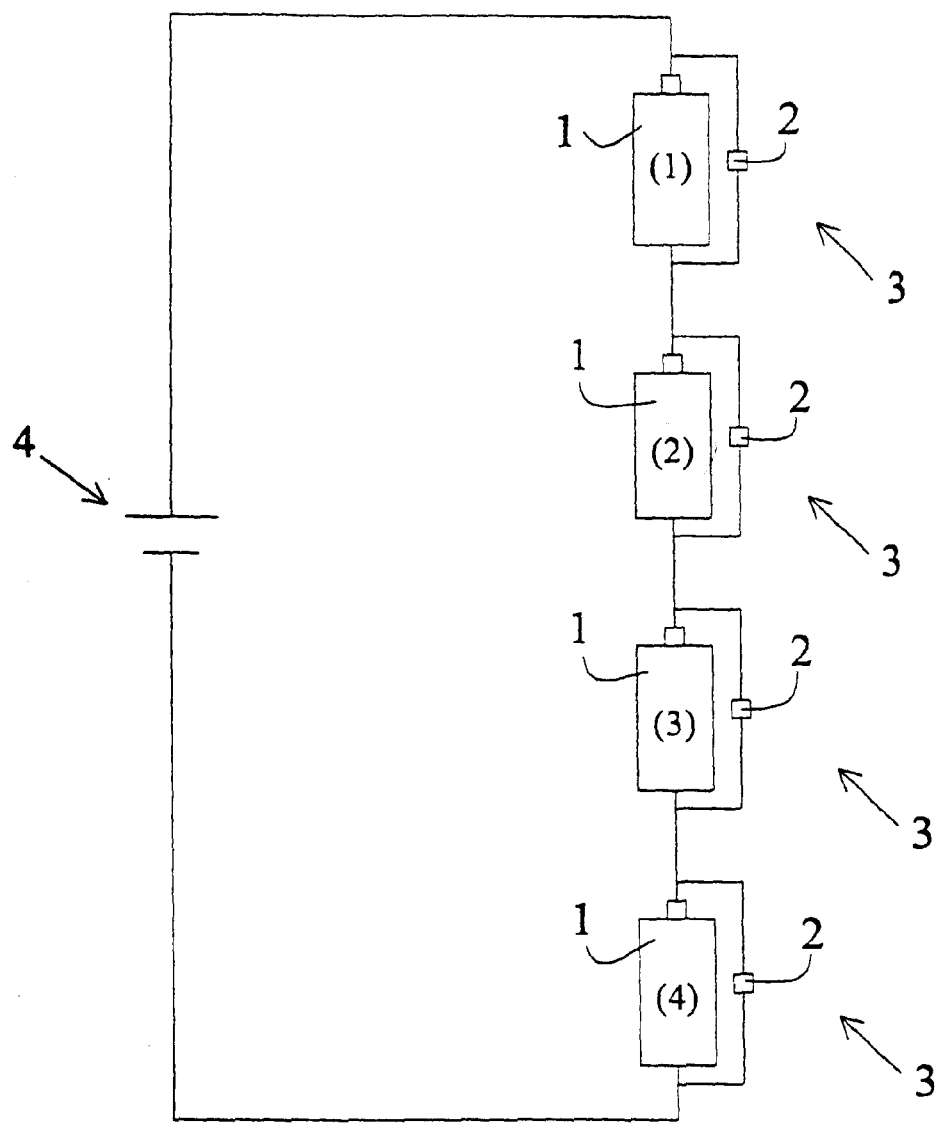
FIG. 2a is a schematic illustration of a battery assembly of the invention with an enlarged drawing of a self-discharging circuit of the invention.
Figure 2A:
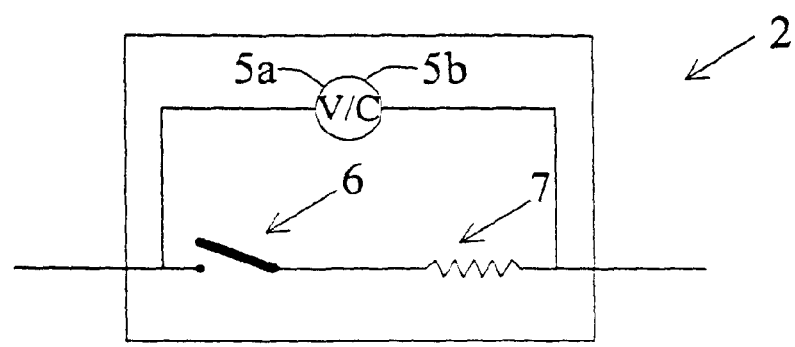
Figure 2B:
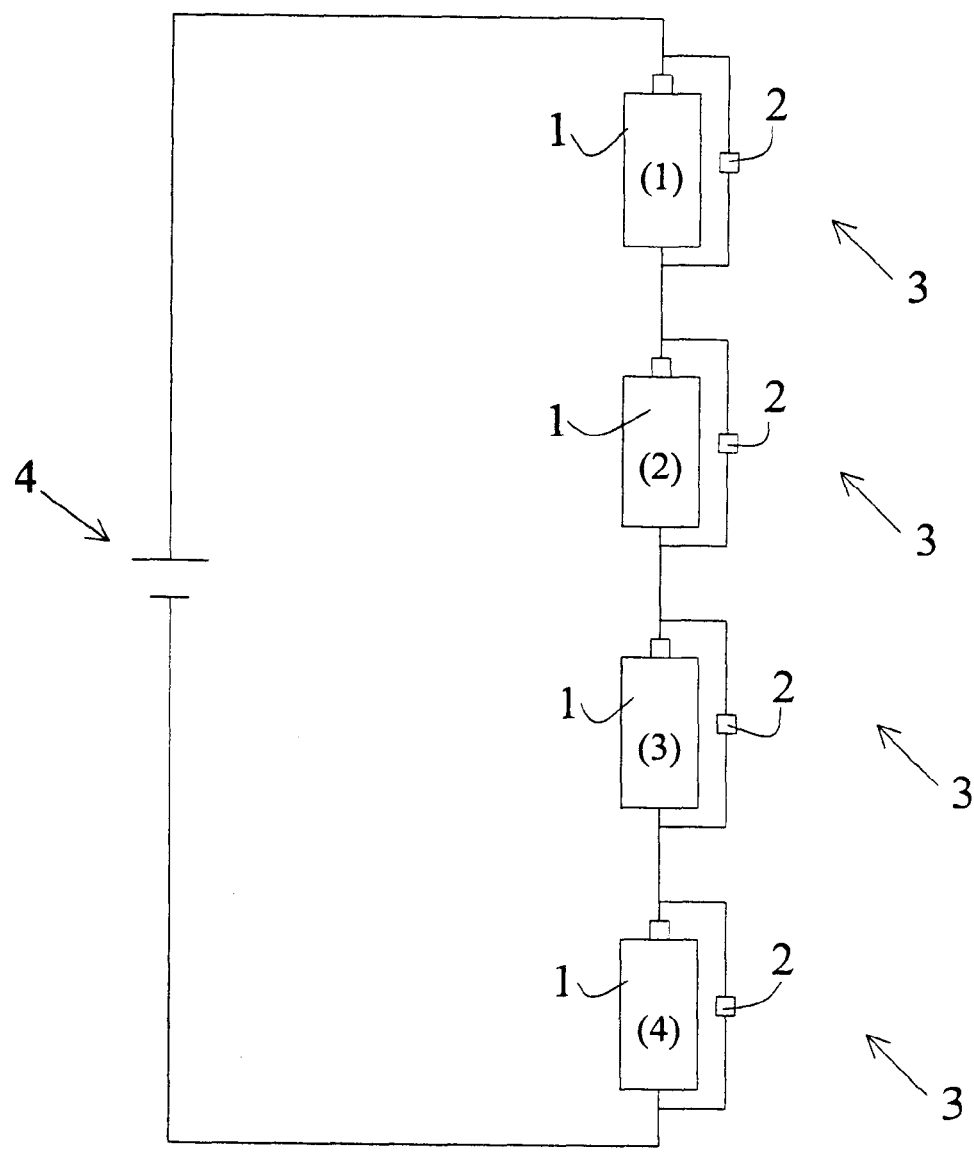
FIG. 2b is a schematic illustration the battery assembly of the invention with an enlarged drawing of another embodiment of a self-discharging circuit of the invention.
Figure 2B:
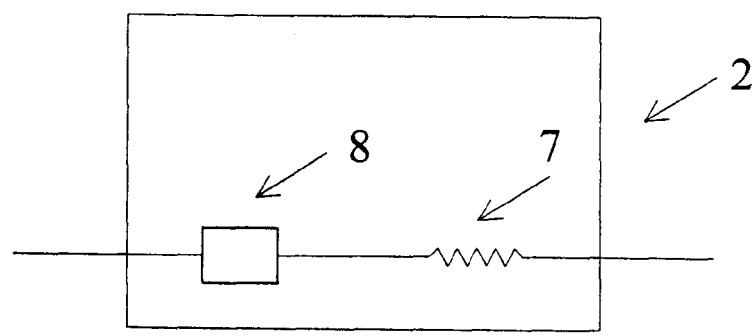

The present method of solving the cell imbalance problem is shown in FIG. 2(a). As indicated in FIG. 2(a), each battery is connected with a device 2 in parallel with the battery. Such device is comprised of a switching element 6, a resistance element 7, a voltage-detecting element 5a, and a switching element controller 5b that opens or closes the switching element 6. The voltage-detecting element detects the voltage of the battery and along with the switching element controller controls the "opened" or "closed" state of the switching element. The switching element, resistance element, voltage-detecting element and switching element controller can be disposed on a printed circuit board. However, since a transistor can function as a combination of a voltage-detecting element, controller, switching element, and a resistance element, the device shown in FIG. 2(a) can be replaced by a transistor, or a plurality of transistors connected in parallel (for adjusting the resistance). Other possibilities are one transistor 8 connected with a resistor 7 in series as shown in FIG. 2(b). In the case of the transistor and resistor connected in series as indicated in FIG. 2(b), the resistance of the resistor should be small in order to minimize the voltage drop caused by the resistor thus affecting the voltage detection of the transistor. The configuration of FIG. 2(b) can also be applicable to diodes such as LEDs, or a printed circuit board consisting of the switching element and the controller only.

When batteries are charged, if the voltage of one of the batteries is above a preset upper limit, the switching element of the device electrically connected in parallel to the battery closes, therefore allowing current to flow through the resistor. Thus, the charging current for the battery that passed the preset upper limit voltage decreases, due to the presence of the device connected in parallel to the battery. Such decrease is shown in Example 1, below. Under such condition, other batteries are charged in a normal current flow but the one that passed the upper voltage limit has a decreased charging action. This is a basic mechanism of the invention for the prevention of battery overcharging. It should be mentioned that the resistance element can be any electronic component that possesses a satisfactory resistance. For example, a light bulb can be used as a source of resistance.

Figure 3:
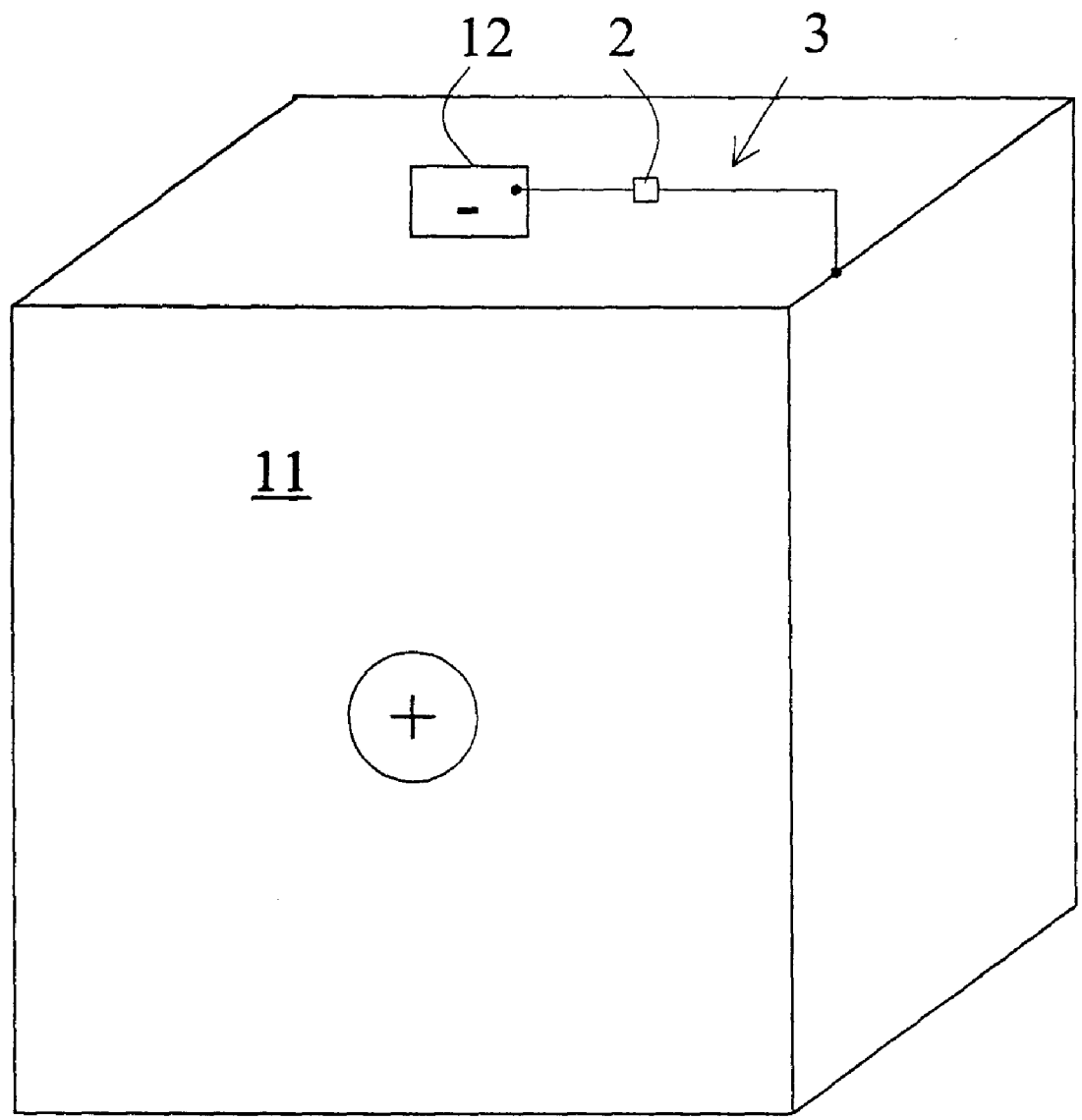
FIG. 3 is a schematic illustration of the battery assembly of the invention having the self-discharging circuit disposed on a case of the battery.

The elements of the device can be on a semiconductor chip 2, which can be disposed anywhere close to the battery. FIG. 3 shows one possibility of the semiconductor chip 2 being built-in on the lid of a case of a battery. Also, for example, the chip can be disposed between the cathode (the case) 11 and the anode (the negative terminal) 12. Also, the chip can be placed inside the battery case.

The resistor can be a variable one if further precise control of the resistance is necessary. Details of the current change for each battery during charging are further described below:

Example 1

Theoretical Demonstration of how cell Equalization can be Achieved

Assumptions:
1. Four battery assemblies are connected in series as indicated in FIG. 2(a).
2. Batteries (1), (3), (4) have internal resistance of 5 mOhm, battery (2) has an internal resistance of 10 mOhm.
3. Batteries (1), (3), (4) have open circuit voltage of 3.3V, battery (2) has an open circuit voltage of 3.6V.
4. For each battery assembly, a resistor of 1.0 Ohm is connected parallel to the battery.
5. A power supply of 15V is applied to the four battery assemblies connected in series.

Calculation Case 1 (when Paralleled Resistors are all Open):

During charging of the four battery assemblies, the voltage of each battery can be represented as:

Battery (1): $V_1 = Vo_1 + I_1 R_1$, $V_1$ is the voltage of the battery (1) during charging, $Vo_1$ is the open circuit voltage of battery (1), $I_1$ is the current passing through battery (1) and $R_1$ is the internal resistance of the battery (1).

Battery (2): $V_2 = Vo_2 + I_2 R_2$,
Battery (3): $V_3 = Vo_3 + I_3 R_3$,
Battery (4): $V_4 = Vo_4 + I_4 R_4$, Since no other resistors are connected, $I_1 = I_2 = I_3 = I_4 = I$ $$15 = (V_1 + V_2 + V_3 + V_4) = (Vo_1 + Vo_2 + Vo_3 + Vo_4) \pm I(R_1 + R_2 + R_3 + R_4)$$

$$15 - (Vo_1 + Vo_2 + Vo_3 + Vo_4) = I(R_1 + R_2 + R_3 + R_4)$$

$$15 - 3.3 - 3.6 - 3.3 - 3.3 = I(0.005 + 0.01 + 0.005 + 0.005)$$

I=60 Amp - - - The current that passes through each battery

Calculation Case 2, (when the Paralleled Resistor Circuit is Closed for Battery (2)):

Assume I' is the current passing through the resistor and R' is the resistance of the resistor.

Then, $$V_2 = I'R', I' = V_2/R'$$

$$V_2 = Vo_2 + I_2 R_2,$$

Considering the current balance: $(I' + I_2) = I_1 = I_3 = I_4 = I$

So, $$V_2 = Vo_2 + (I - I')R_2 = Vo_2 + (I - V_2/R')R_2$$

Rearrange, then we get $$V_2 = (Vo_2 + IR_2)/(1 + R_2/R')$$

Thus, $$15 = (V_1 + V_2 + V_3 + V_4) = (Vo_1 + Vo_3 + Vo_4) + I(R_1 + R_3 + R_4) + (Vo_2 + IR_2)/(1 + R_2/R')$$

So, $$I = 61.672 (A),$$

$$V_2 = (Vo_2 + IR_2)/(1 + R_2/R') = 4.175 (V),$$

$$I'=V_2/R'=4.175(A),$$

$$I_2=I-I'=57.497(A)$$

If we substitute a resistor of 10 Ohm, then $$I=60.168(A),$$

$$V_2=Vo_2+(I-V_2/R')R_2=4.1975(V),$$

$$I'=V_2/R'=0.4198(A),$$

$$I_2=I-I'=59.748(A)$$

Conclusions from the Calculations:
1. With regards to battery assembly of FIG. 2(a), when the switch of the resistor in the parallel circuit is closed, current flows through the resistor, and the charging current for battery (2) is decreased.
2. While the switch of the paralleled resistor circuit is closed for the battery assembly of FIG. 2(a), the charging current for other batteries (1, 3, 4) is increased.
3. The resistance of the resistor dictates the magnitude of the current decrease for battery (2). The smaller the resistance, the bigger the magnitude of current decrease.
4. Thus, the idea of incorporating a resistor with each battery connected in series is effective in balancing the capacity of all batteries by decreasing the charging current of the battery that has a higher capacity, and by increasing the charging current of the other batteries that have a lower capacity.
5. It is clear that the resistor connected in parallel with the battery should possess satisfactory cell balancing function. Any electronic devices or components that satisfy the function of voltage sensing and providing the source of resistance are within the focus of the present invention.

Example 2

Theoretical Calculation Demonstrating a Method of Charging a Battery Assembly

Assumptions:
1. Four battery assemblies are connected in series as indicated in FIG. 2(a).
2. Batteries (1), (3), (4) have internal resistance of 5 mOhm, battery (2) has an internal resistance of 10 mOhm.
3. Batteries (1), (3), (4) have open circuit voltage of 3.3V, battery (2) has an open circuit voltage of 3.6V.
4. Batteries (1), (2), (3), and (4) are subjected to a constant current charge. The current is 2 A.
5. For demonstration purpose, the battery being investigated, battery (2), a resistor of 1.0 Ohm is connected parallel to the battery and the circuit switch is closed.

Calculations:

Considering the current balance: $(I'+I_2)=I_1 I_3=I_4=I=2(A)$ $$V_2=Vo_2+(I-I')R_2=Vo_2+(I-V_2/R')R_2$$

Rearrange, then we get $$V_2=(Vo_2+IR_2)/(1+R_2/R')$$

Substituting $Vo_2=3.6(V)$, I=2 (A), $R_2=0.01$ Ohm, R'=1 Ohm

We get:

$$V_2=3.5842(V)$$

$$I'=V_2/R'=3.5842(A),$$

$$I_2=I-I'=2-3.5842=-1.5842(A)<0$$

Conclusions from the Calculations:
1. The battery that is overcharged will undergo discharging when the circuit current (I) is less than the current that passes the resistor (I'). That is, (I-I'<0).
2. When batteries being overcharged undergo discharge, cell balance can be achieved.
3. By combining the calculation results shown in Example 1 and 2, it can also be concluded that the cell balance charging method can be implemented as either a constant voltage mode (but the charging time required should be longer than the time required for the condition of I<I'), or a constant current mode by passing a current (I) that is less than the current that passes the resistor (I').
4. It can further be concluded that the charger can be designed to have two modes for charging. One mode is the normal constant current/constant voltage charge mode for a battery system's normal use (end of charge executed by setting a certain charging time). The other mode is the cell balance mode (constant current charging) that can be used when a battery system possesses less capacity than their normal use.

Example 3

A Battery Pack and a Battery System

Figure 9:
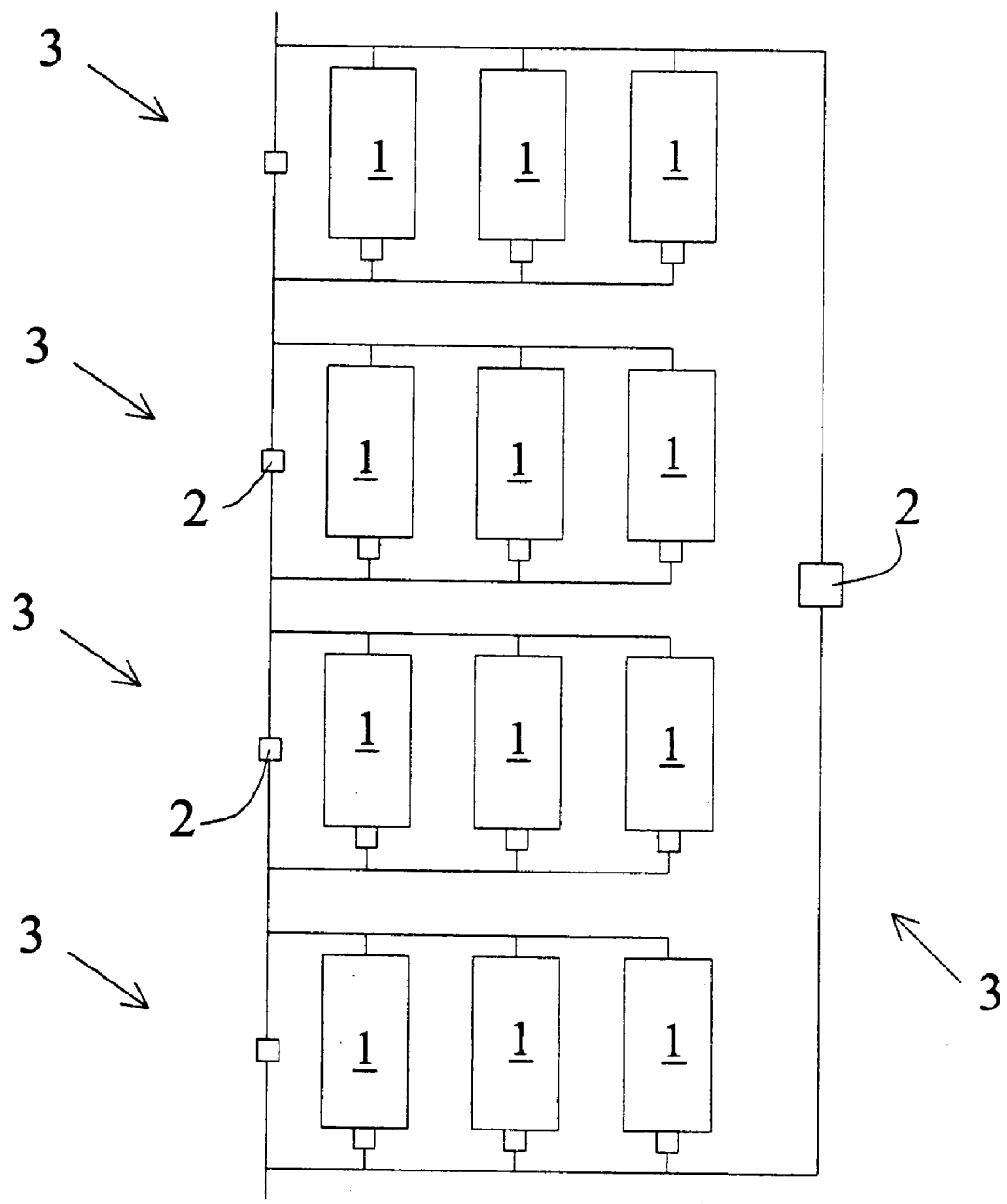
FIG. 9 is a schematic illustration of a battery pack assembly having battery assemblies of the invention.

As mentioned above, a battery pack can be comprised of battery sets, or battery set assemblies as shown in FIG. 1(a)-(e). In the present invention, a battery pack may also connect with a parallel circuit containing a switching element, a voltage-detecting element, a controller, and a resistance element to form a "battery pack assembly". The possible structures of battery packs constructed using battery set assemblies are shown in FIGS. 5(a)-(e), FIGS. 6(a)-(e), FIGS. 7(a)-(e), and FIGS. 8(a)-(e). These figures represent the five unit structures shown in FIGS. 1(a)-(e) being connected in various circuit arrangements. In series (FIGS. 5(a)-(e)), in parallel (FIGS. 6(a)-6(e)), in parallel-series (FIGS. 7(a)-7(e)), and in series-parallel (FIGS. 8(a)-8(e)). Each of the cases shown in FIGS. 5, 6, 7, and 8 can again be combined with a parallel circuit containing the switching element, the controller, the voltage-detecting element and the resistance element to form a "battery pack assembly". An example of a "battery pack assembly" is shown in FIG. 9

Figure 10:
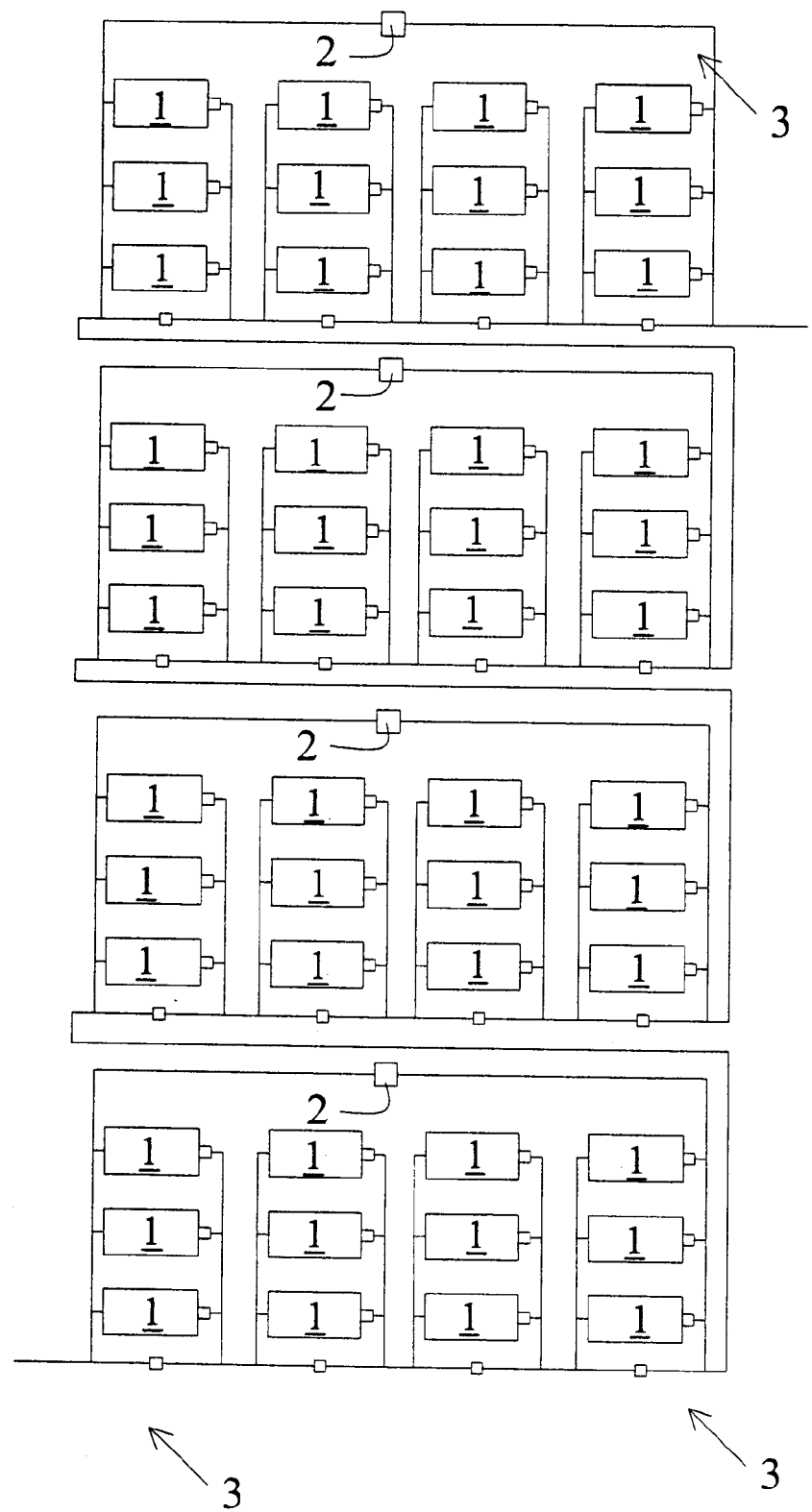
FIG. 10 is a schematic illustration of a battery system having battery assemblies of the invention, as discussed in example 3.

Similar to the case as a battery pack that is comprised of battery sets or battery set assemblies, a battery system is comprised of battery packs or battery pack assemblies. Again, the possible structures of a battery system constructed using battery pack assemblies can be in series, parallel, parallel-series, and series-parallel. An example of a "battery system" is shown in FIG. 10.

One practical case is described here, that is an example of the battery system for an electric motorcycle. Referring to FIG. 10, a typical electric motorcycle uses a battery system having 53V, and 40 Ah. The battery system is comprised of four battery packs (13.3V) connected in series. Each of the battery packs consists of four lithium iron battery sets (3.33V) connected in series. And, each of the battery sets consists of four 10 Ah batteries connected in parallel. In this case, the best structure of the battery system is the utilization of battery pack assemblies and the battery set assemblies, as building blocks for the battery system. In such arrangement, overcharging of battery packs and overcharging of battery sets can be prevented. If the battery system is constructed using battery pack assemblies but the pack assemblies are constructed by battery sets only, some possible overcharging in the battery set may occur after long time cycling. If the battery system is constructed using battery packs only and the battery packs are constructed using battery sets rather than battery set assemblies, cell imbalance accompanied with overcharging during charging can occur.

Example 4

A Preferred Electric Power Supply System

Figure 4:
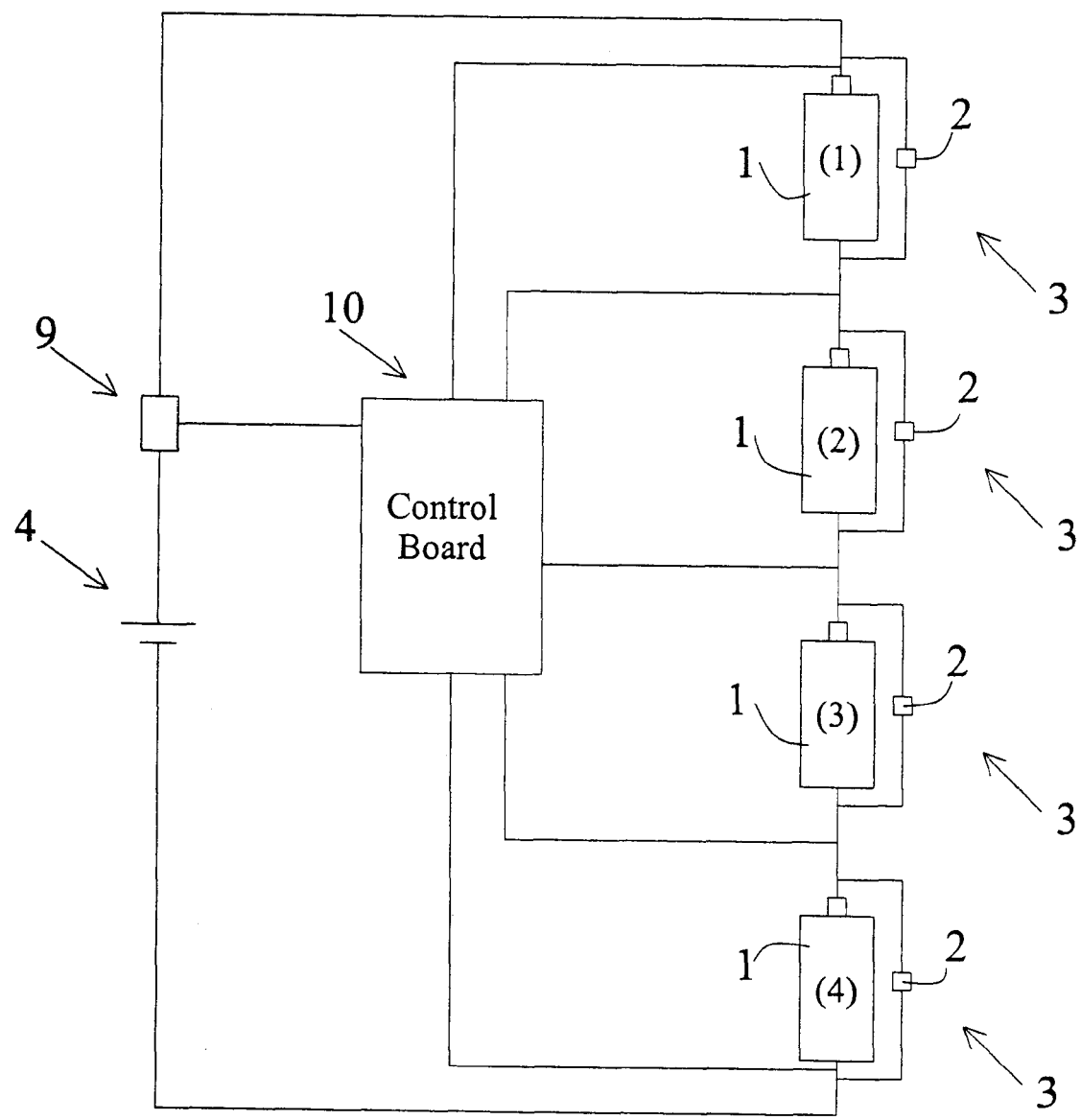
FIG. 4 is a schematic illustration of an electric power supply system having battery assemblies of the invention.
Figure 5A:
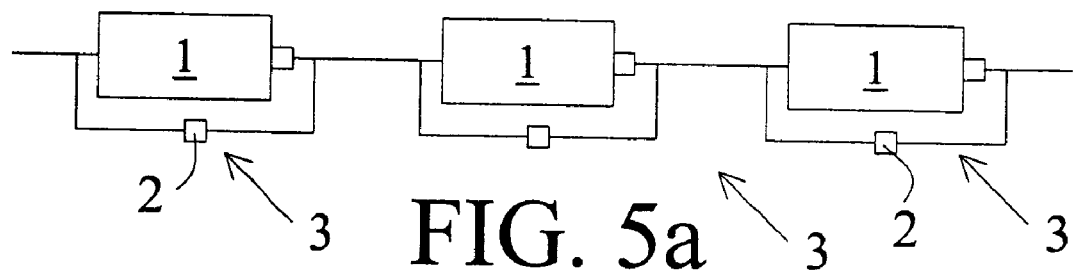
FIGS. 5a-e are schematic illustrations of battery packs having battery assemblies of the invention
Figure 5B:
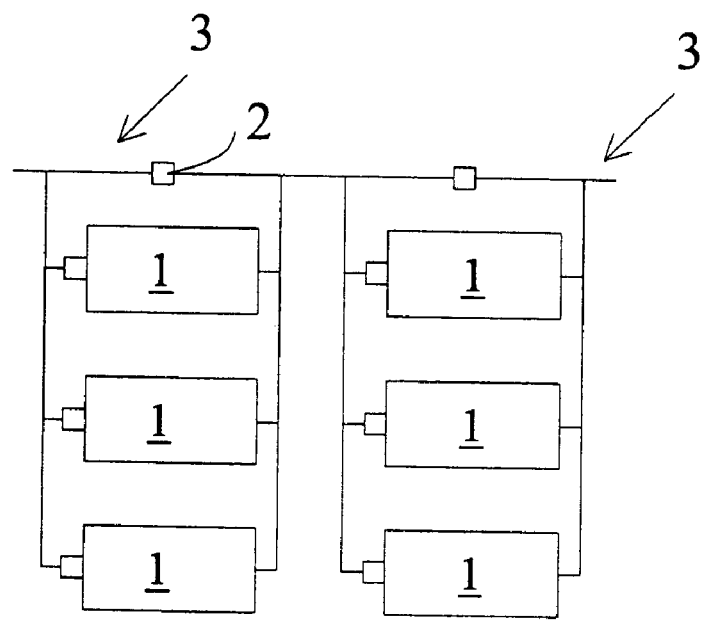
Figure 5C:
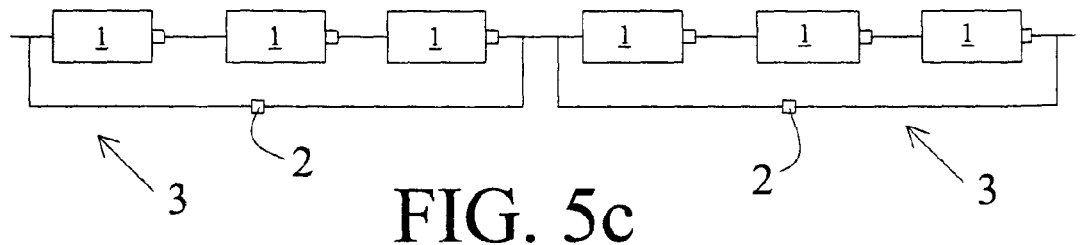
Figure 5D:
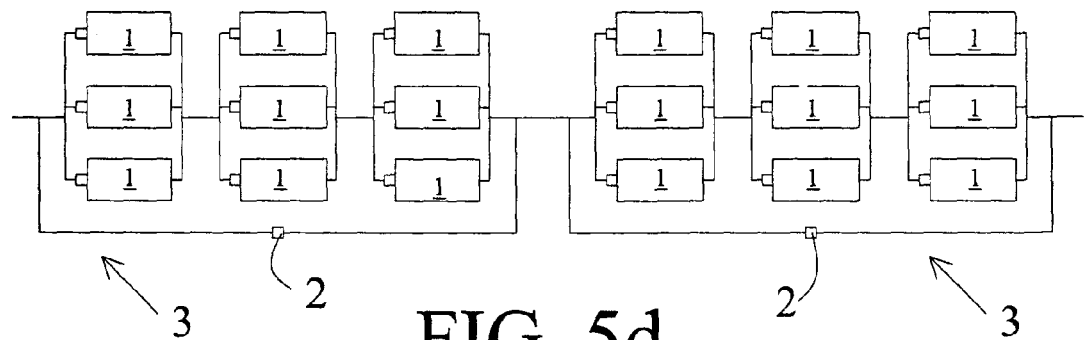
Figure 5E:
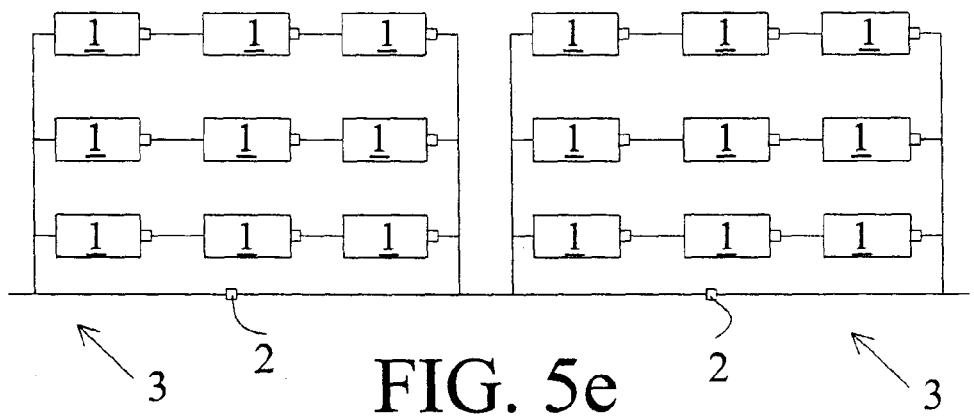
Figure 6A:
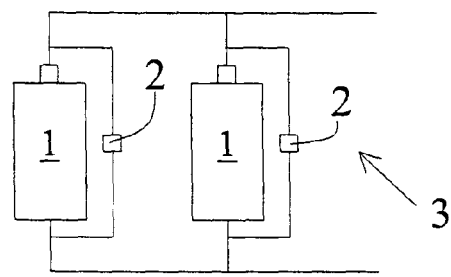
FIGS. 6a-e are schematic illustrations of battery packs having battery assemblies of the invention differing from those of FIGS. 5a-e.
Figure 6B:
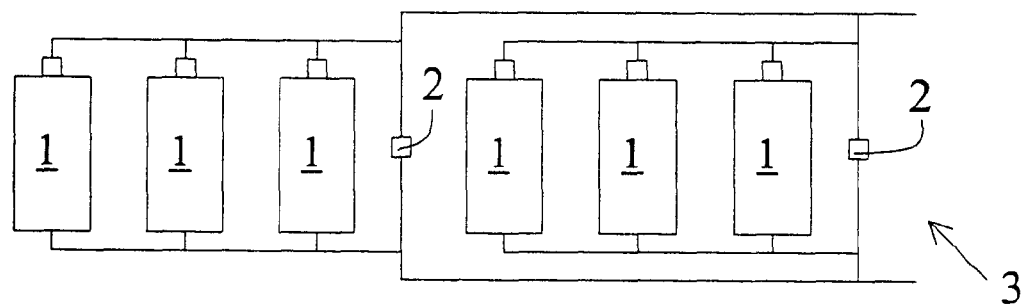
Figure 6C:
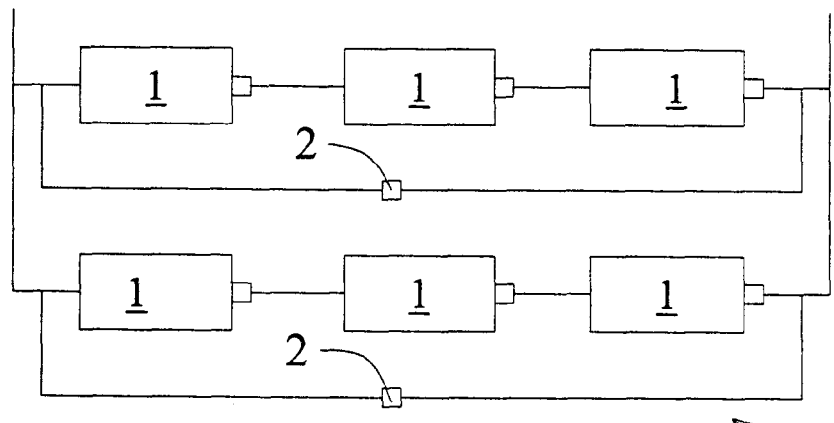
Figure 6D:
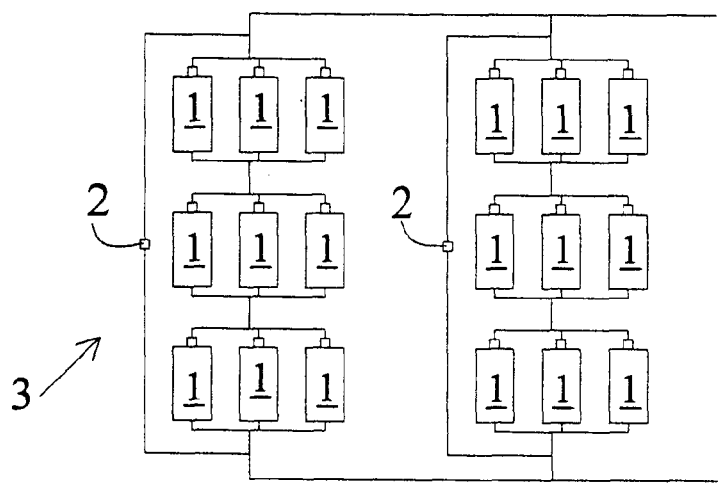
Figure 6E:
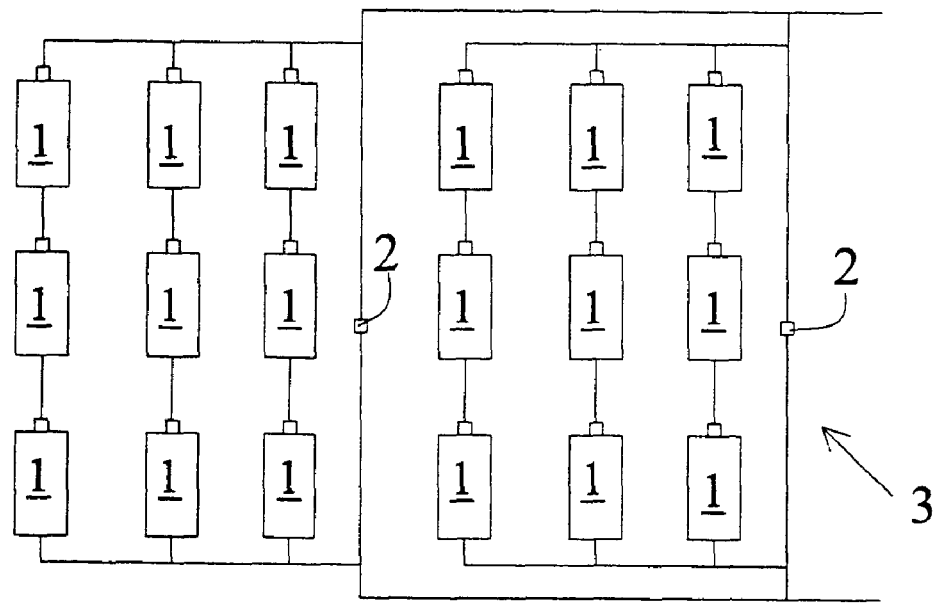
Figure 7A:
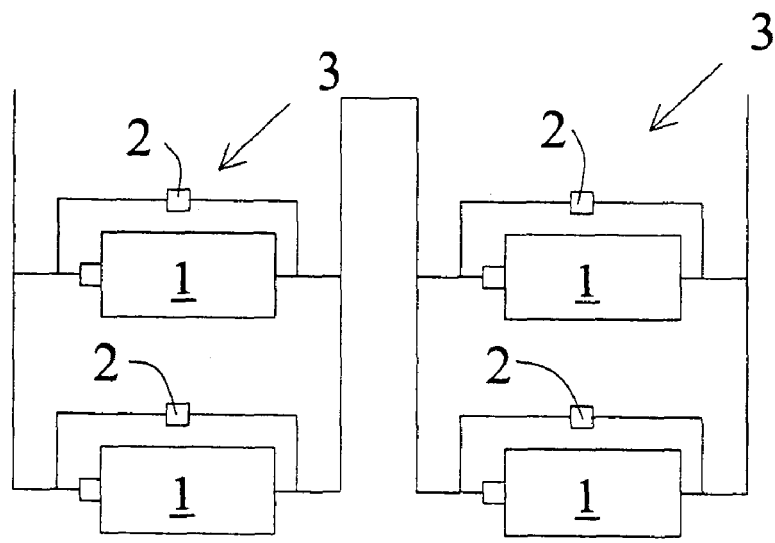
FIGS. 7a-e are schematic illustrations of battery packs having battery assemblies of the invention differing from those of FIGS. 5a-e and 6a-e.
Figure 7B:
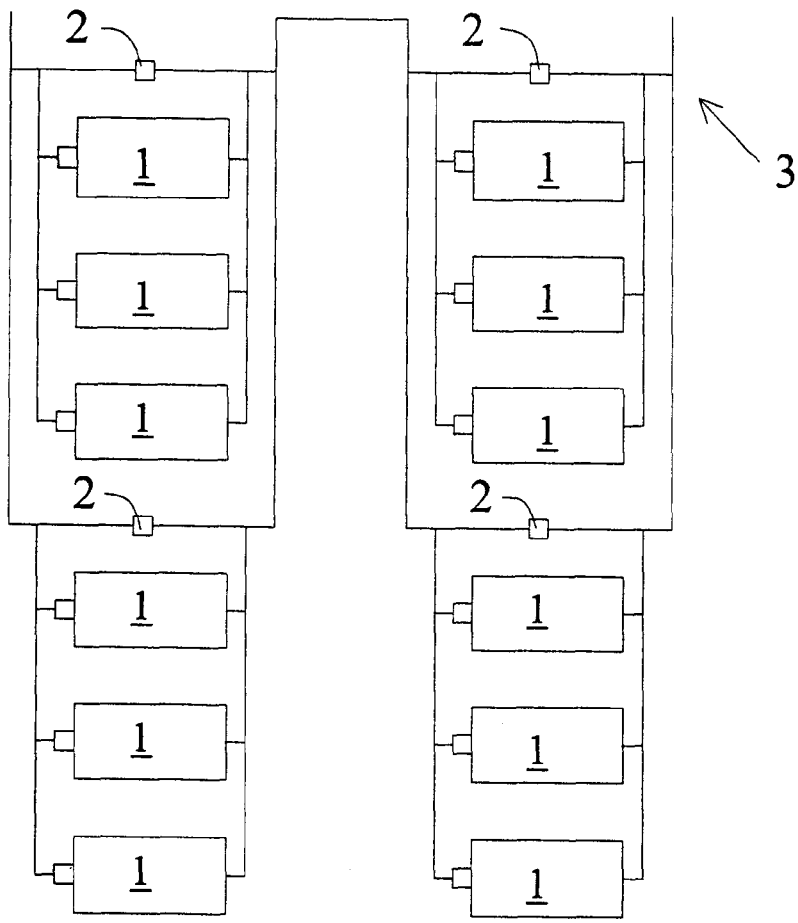
Figure 7C:
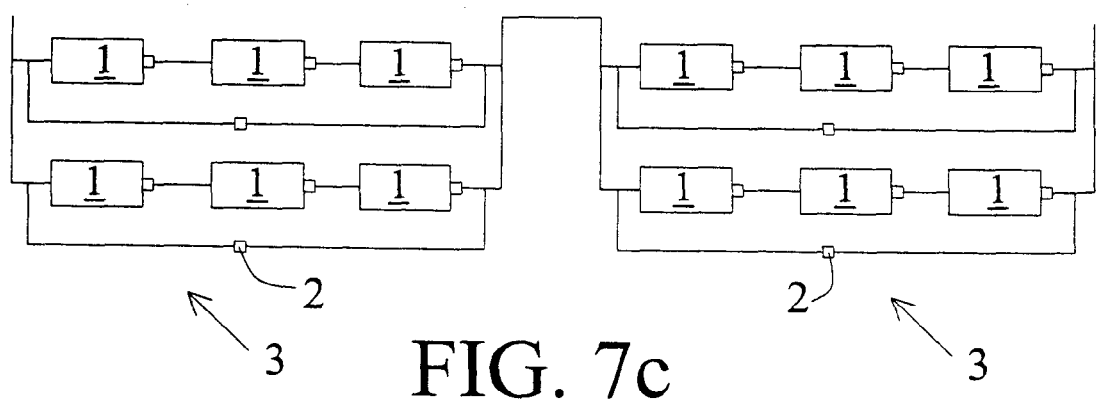
Figures 7D, 7E:
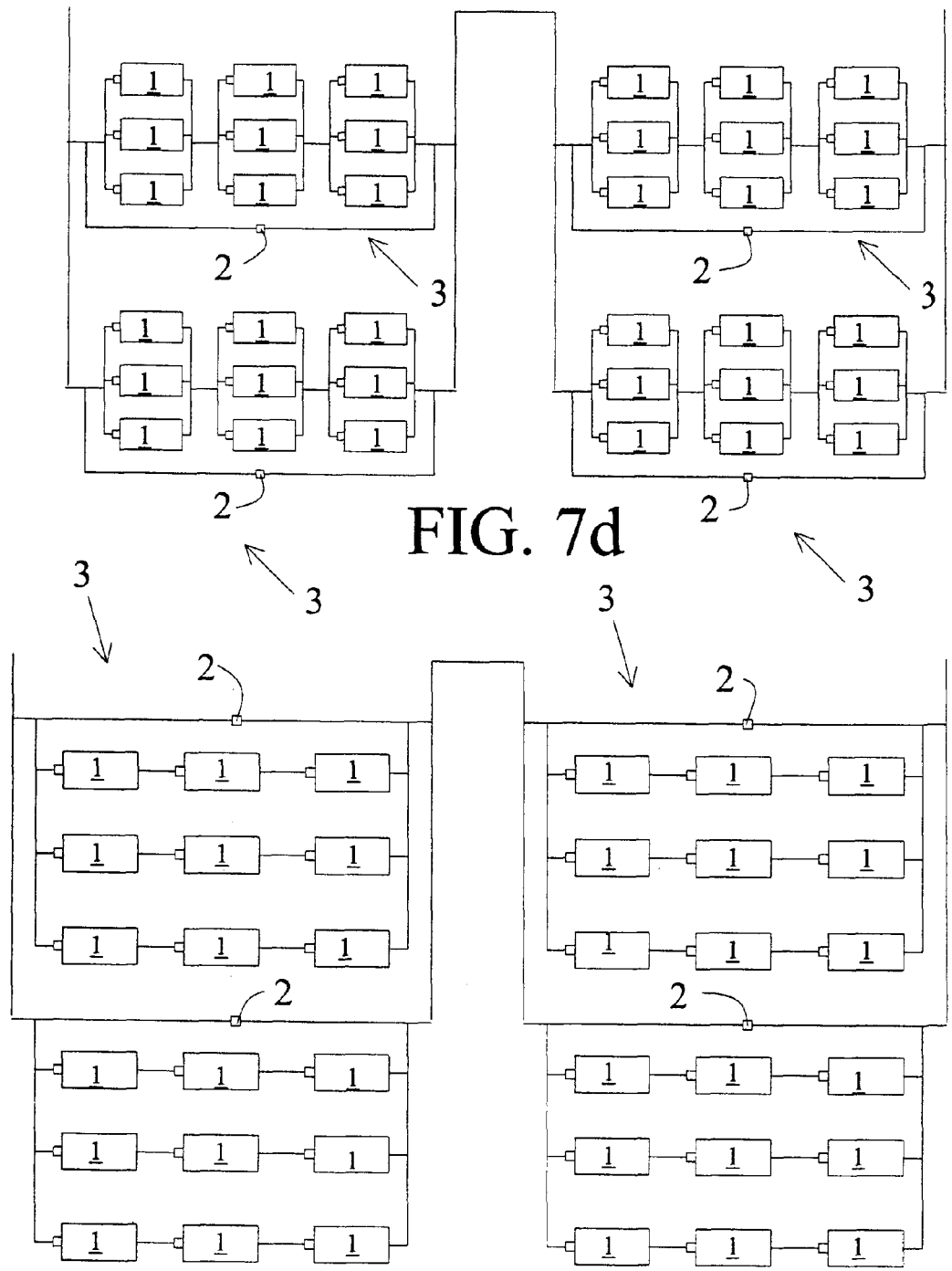
Figure 8A:
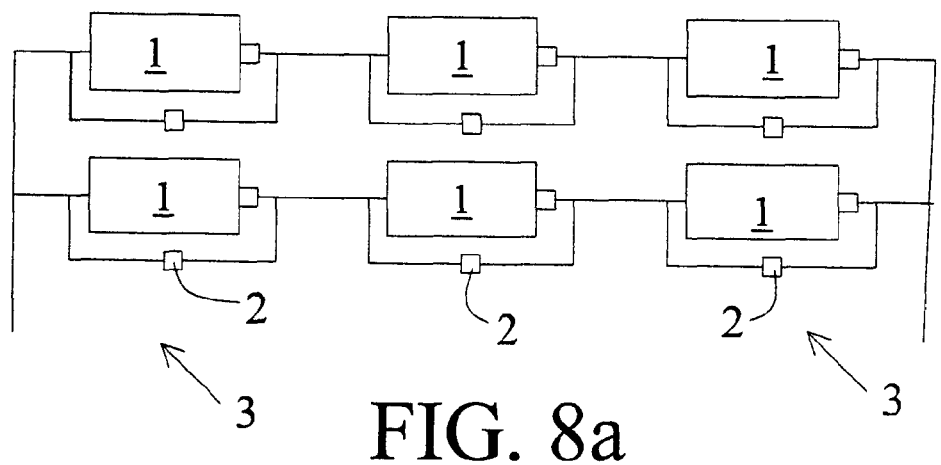
FIGS. 8a-e are schematic illustrations of battery packs having battery assemblies of the invention differing from those of FIGS. 5a-e, 6a-e and 7a-e.
Figure 8B:
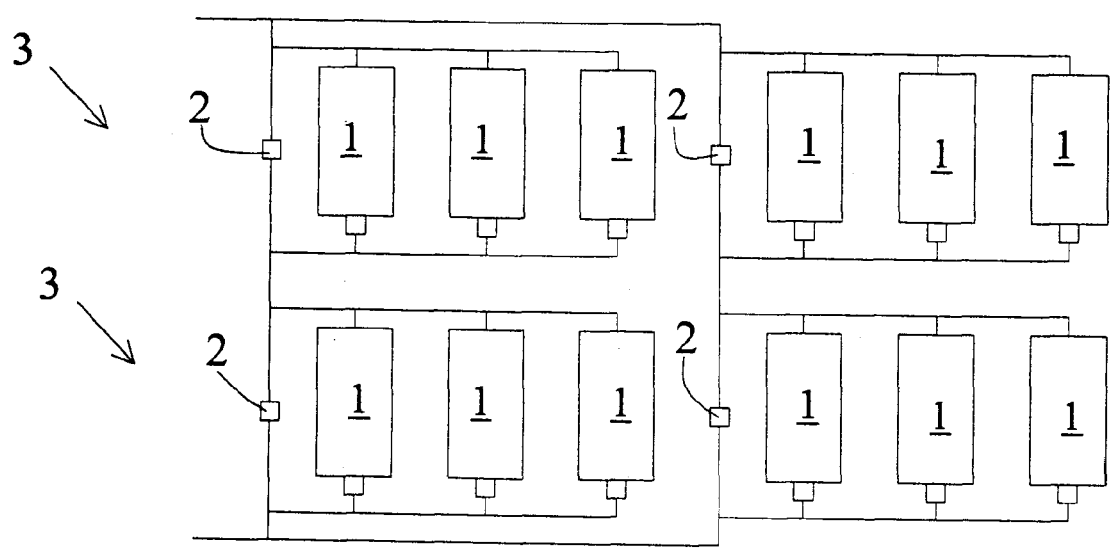
Figure 8C:
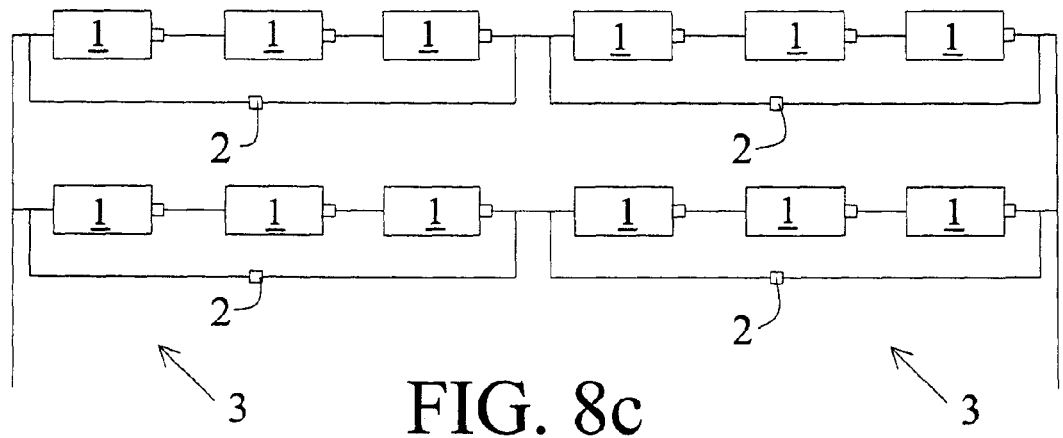
Figure 8D:
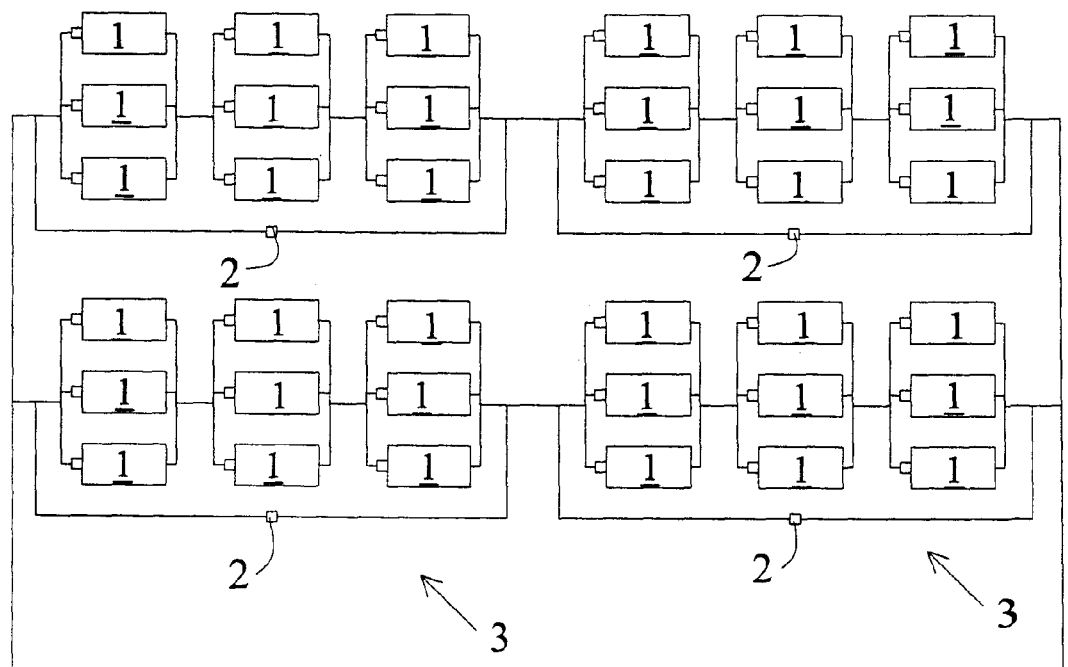
Figure 8E:
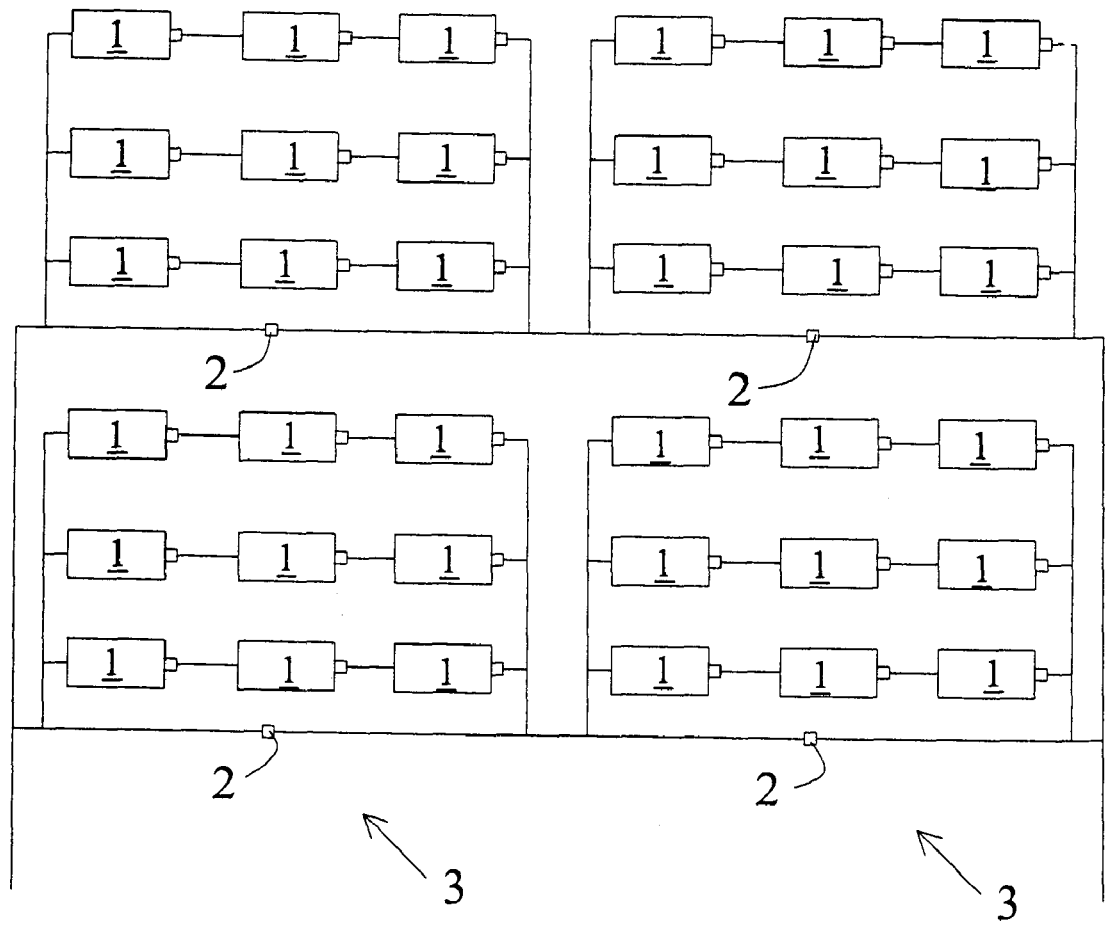

An electric power supply system is the integration of components including a charger 4, a battery system (packs or sets), a control board 10, and a circuit breaker 9, as shown in FIG. 4. Again, four battery assemblies of the invention are connected in series as a simplest example for demonstration. Referring to FIG. 4, it can be seen that each battery is connected in parallel with a circuit consisting of components as shown in FIG. 2(*a*) or FIG. 2(*b*). A control board is connected with electrical conductors to each terminal of each of the batteries. Those electrical conductors serve as a means for providing voltage detection. The other end of the control board is connected to a circuit breaker. The charger is connected directly to the two ends of the batteries electrically connected in series. During a normal charging (constant current/constant voltage), if any of the batteries exceeds a preset overcharge voltage, the control board sends a signal to the circuit breaker for charging termination. Similarly, during such discharging, if any of the batteries is below the preset termination voltage, the control board sends a signal to the circuit breaker for discharging termination. These two actions serve as battery protection to avoid overcharging and over discharging. During normal charging, a preset time period is allowed for the charging action (e.g. termination at 1.5 hours after constant voltage charging). At that time, the batteries may be more or less balanced. However, the batteries could be balanced after several chargings, or by just starting a balance charging (small current constant and current charge, current amplitude I<I') mode, to allow constant current charging until all the batteries are balanced.

In the present case, the control board can be a very simple device for detecting the voltages of each battery connected in series and sending signals to the circuit breaker for charging or discharging action termination. The simplicity of the control board is thus benefited by the characteristics of the batteries of the invention since they possess current leakage during charging. In the present invention, the shutting off of the charging is preferably executed by a electromagnetic relay that turns off the power input or output. This electromagnetic relay preferably requires no power consumption during the idle state, and a pulse signal generated by the control board determines the close and open circuit status of the relay and therefore the on and off of the battery charging.

Example 5

Methods to Achieve Cell Equalization as Described in Example 1

Figure 11:
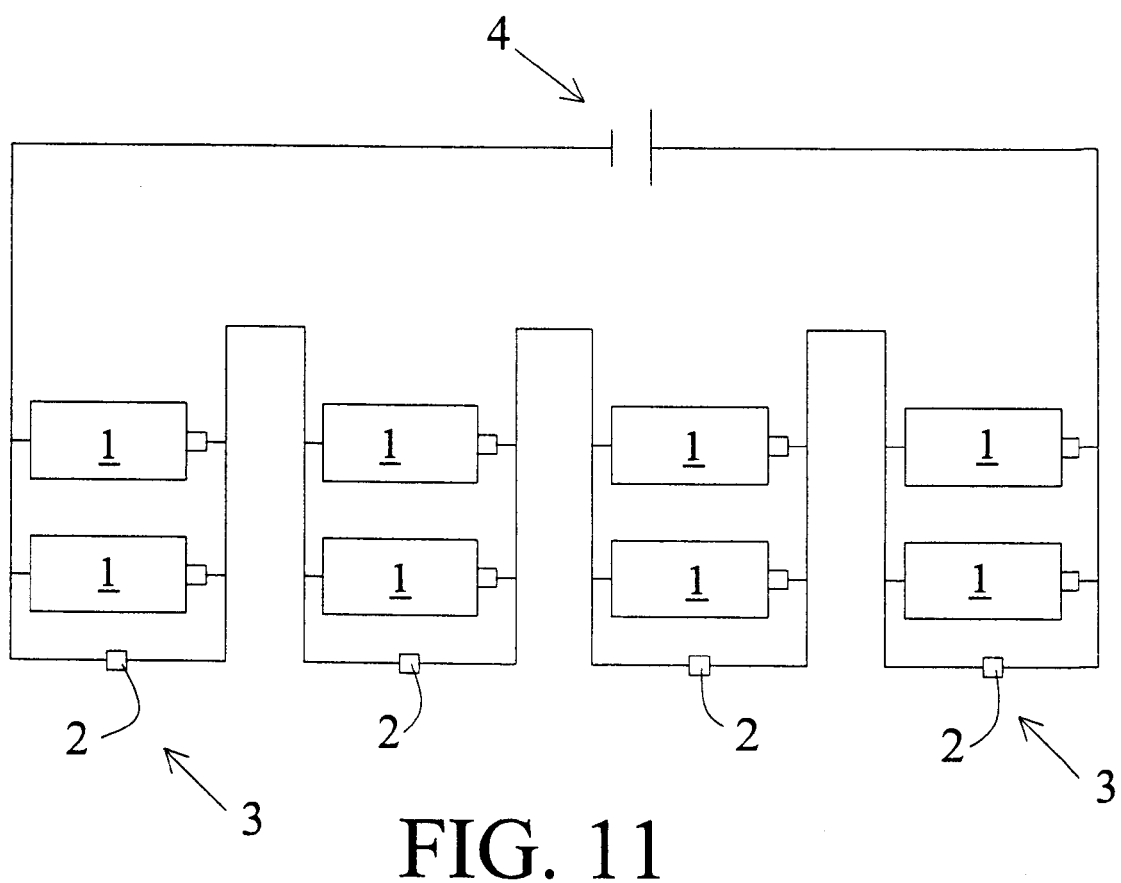
FIG. 11 is a schematic illustration of a battery system having battery assemblies of the invention, as discussed in example 5.

Referring to FIG. 11, in the present example, a total of eight 10 Ah lithium iron batteries are used for demonstrating the charging method and the cell balancing characteristic of the batteries during charging. Two cells are first connected in parallel to form a parallel battery set. Each set of the batteries are then connected with a circuit (a printed circuit board, for example) electrically connected in parallel with the battery set to form a battery assembly. Four battery assemblies are then connected in series. In the present case, the first set, second set, third set, and the fourth set are named for the four battery set assemblies connected in series for clarity. All four set assemblies are first charged to 100% full. The first battery set assembly is then subjected to discharge 10% capacity (2 Ah). After this procedure, all four battery set assemblies are connected in series and this setup is referred to as the battery pack. A preset self-discharge activation voltage is set at 3.75V in the present case. The self-discharge circuit that is parallel to each battery set has a resistance of 2 Ohm. After the above mentioned procedures, the battery pack is subjected to a constant current charge of 1.7 A. The voltage changes versus time for each set of the batteries are shown in Table I. From Table I it can be seen that the $2^{nd}$, $3^{rd}$, and $4^{th}$ battery set assembly had a voltage increase beyond 3.75V in the initial state. 5 minutes after, the $2^{nd}$, $3^{rd}$, and $4^{th}$ battery set assembly came back to be stabilized at 3.75V. At this time, the current passing through the resistor is measured to be 1.8 A.

The $1^{st}$ set of the battery set assembly increases its voltage gradually to 3.75V after 80 minutes and this is the end of the charge balance action. In the present experiment, I (power supply current) is set to be less than I' (current passing resistor). As a result, the voltages for the $2^{nd}$, $3^{rd}$, and $4^{th}$ sets of battery set assemblies were stabilized at 3.75V during charging. Full balances of the four sets of battery set assemblies were achieved after a certain period of time. It was observed that if current I is set to be slightly larger than current I' (1.8 A in this case), and the voltages of the $2^{nd}$, $3^{rd}$, and $4^{th}$ battery sets could be higher than 3.75V during the constant current charge. However, if the constant voltage charge is set at 15V as the second step charging, a voltage decrease of $2^{nd}$, $3^{rd}$, and $4^{th}$ battery sets can be observed (when current I starts decreasing below current I') and the four sets of battery set assemblies can be balanced eventually, but requiring a longer time.

TABLE I

Voltage versus time for each set of the batteries.
40138 12V20Ah Lithium Iron Cell Balance
Charging Test
Constant current charge (current = 1.7A)

| Set Number | 1 | 2 | 3 | 4 |
|---|---|---|---|---|
| Initial Voltage (V) | 3.344 | 3.354 | 3.348 | 3.35 |
| Time (minutes) | | Voltage for each set (V) | | |
| 0 | 3.401 | 3.883 | 3.852 | 3.861 |
| 5 | 3.457 | 3.761 | 3.757 | 3.759 |
| 10 | 3.462 | 3.752 | 3.761 | 3.762 |
| 15 | 3.473 | 3.753 | 3.755 | 3.757 |
| 20 | 3.481 | 3.756 | 3.751 | 3.754 |
| 30 | 3.499 | 3.759 | 3.752 | 3.757 |
| 40 | 3.558 | 3.753 | 3.756 | 3.755 |
| 50 | 3.633 | 3.758 | 3.754 | 3.756 |
| 60 | 3.757 | 3.751 | 3.753 | 3.754 |
| 70 | 3.752 | 3.757 | 3.756 | 3.752 |
| 80 | 3.759 | 3.751 | 3.754 | 3.755 |

What is claimed is:
1. A rechargeable battery set assembly, comprising
a plurality of rechargeable batteries, each having a positive terminal and a negative terminal, electrically connected to form a battery set, wherein said battery set is selected from a parallel battery set having the plurality of rechargeable batteries electrically connected in parallel to form the parallel battery set, a series battery set having the plurality of rechargeable batteries electrically connected in series to form the series battery set, and a parallel-series battery set having a plurality of parallel battery sets electrically connected in series to form the parallel-series battery set, and a means for self-discharging the battery set, said means being electrically connected in parallel with said battery set, to self-discharge said battery set when a voltage across the battery set is greater or equal to a preset value.

2. The rechargeable battery set assembly of claim 1, wherein said means for self-discharging comprises a resistance element and a switching element connected in series, a voltage detecting element for detecting the assembly voltage, and a switching element controller for closing the switching element when the assembly voltage is greater or equal to the preset value and opening the switching element when the assembly voltage is less than the preset value by a selected amount.

3. The rechargeable battery set assembly of claim 2, wherein said resistance element, said switching element and said switching element controller are disposed on a printed circuit board.

4. The rechargeable battery set assembly of claim 2, wherein said switching element and said switching element controller are disposed on a printed circuit board.

5. The rechargeable battery set assembly of claim 2, wherein
said switching element is selected from a group consisting of a manual switch, a solenoid controlled contactor, and a transistor.

6. The rechargeable battery set assembly of claim 2, wherein
said resistance element is selected from a group consisting of a resistor, a light bulb and an LED.

7. The rechargeable battery set assembly of claim 2, wherein
said resistance element, said switching element and said switching element controller are a transistor or a plurality of transistors.

8. The rechargeable battery set assembly of claim 2, wherein
said resistance element, said switching element and said switching element controller are a combination of transistors and resistors.

9. The rechargeable battery set assembly of claim 2, wherein
said resistance element, said switching element and said switching element controller are an LED or a plurality of LEDs.

10. The a rechargeable battery set assembly of claim 2, wherein
said resistance element, said switching element and said switching element controller are a combination of LEDs and resistors.

11. The rechargeable battery set assembly of claim 2, wherein
said resistance element, said switching element and said switching element controller are integrated on a semiconductor chip.

12. The rechargeable battery set assembly of claim 2, wherein
said switching element and said switching element controller are integrated on a semiconductor chip.

13. The rechargeable battery set assembly of claim 2, wherein
said resistance element is controllable to vary its resistance value and the resistance value is controlled by a resistance control element in relation to voltage detected by said voltage detecting element.

14. The rechargeable battery set assembly of claim 1, wherein
said means for self-discharging is integrated on a semiconductor chip, and
said semiconductor chip is disposed on a rechargeable battery.

15. The rechargeable battery set assembly of claim 1, wherein
said means for self-discharging is integrated on a semiconductor chip,
each said rechargeable battery is enclosed in a case and
said semiconductor chip is disposed within a case.

16. A rechargeable battery pack, comprising
a plurality of said assembly of claim 1, electrically connected in series, parallel or a combination of series and parallel.

17. A rechargeable battery pack assembly, comprising
the rechargeable battery pack of claim 16, and
means for self-discharging the rechargeable battery pack when a voltage across said battery pack is greater or equal to a preset value, said means for self-discharging being electrically connected in parallel with the battery pack.

18. An electric power supply system, comprising
a plurality of said assembly of claim 1, electrically connected in series, parallel or a combination of series and parallel system circuit for charging the plurality of said rechargeable batteries,
a battery charger in the system circuit for charging the plurality of rechargeable batteries,
a system circuit breaking element in the system circuit, and
a system controller for detecting the voltage across each said assembly in the system circuit in series form, for opening the system circuit breaking element when a detected voltage is greater or equal to a selected high voltage and for opening the system circuit breaking element when a detected voltage is less than or equal to a selected low voltage.

19. An electric power supply system, comprising
a plurality of said battery pack of claim 16 electrically connected in series, parallel or a combination of series and parallel in a system circuit for charging,
a battery charger in the circuit,
a system circuit breaking element in the circuit, and
a system controller for detecting the voltage across each said assembly in the system circuit in series form, for opening the system circuit breaking element when a detected voltage is greater or equal to a selected high voltage and for opening the system circuit breaking element when a detected voltage is less than or equal to a selected low voltage.

20. An electric power supply system, comprising
a plurality of said battery pack assembly of claim 17, electrically connected in series, parallel or a combination of series and parallel in a system circuit for charging,
a battery charger in the circuit,
a system circuit breaking element in the circuit, and
a system controller for detecting the voltage across each said assembly in the system circuit in series form, for opening the system circuit breaking element when a detected voltage is greater or equal to a selected high voltage and for opening the system circuit breaking element when a detected voltage is less than or equal to a selected low voltage.

21. The electric power supply system of claim 18, wherein the system circuit breaking element is an electromagnetic switch requiring no energy consumption when in the closed condition, and said electromagnetic switch is opened by a signal from the system controller.

22. The electric power supply system of claim 19, wherein the system circuit breaking element is an electromagnetic switch requiring no energy consumption when in the closed condition, and said electromagnetic switch is opened by a signal from the system controller.

23. The electric power supply system of claim 20, wherein the system circuit breaking element is an electromagnetic switch requiring no energy consumption when in the closed condition, and said electromagnetic switch is opened by a signal from the system controller.

24. A method for charging the rechargeable batteries of a plurality of the assembly of claim 1, electrically connected in a series, parallel or a combination of series and parallel circuit, comprising
   providing a battery charger in the circuit for charging the rechargeable batteries at a selected constant voltage, and
   charging the rechargeable batteries for a time period greater than a time required for a current in the circuit to be less than or equal to a current passing through the resistance element of any one of the plurality of the assembly.

25. A method for charging the rechargeable batteries of a plurality of the assembly of claim 1, electrically connected in a series, parallel or a combination of series and parallel circuit, comprising
   providing a battery charger in the circuit for charging the plurality of rechargeable batteries at a selected constant current, and
   charging the rechargeable batteries for a time period greater than a time required for a current in the circuit to be less than or equal to a current passing through the resistance element of any one of the plurality of the assembly.

26. A method for charging the rechargeable batteries of a plurality of the assembly of claim 1, electrically connected in a series, parallel or a combination of series and parallel circuit, comprising
   providing a battery charger in the circuit for charging the plurality of rechargeable batteries at a selected constant current followed by a constant voltage, and
   charging the rechargeable batteries for a time period greater than a time required for a current in the circuit to be less than or equal to a current passing through the resistance element of any one of the plurality of the assembly.

27. A method for charging the rechargeable batteries of the power supply system of claim 18, comprising
   providing a battery charger in the circuit for charging the rechargeable batteries at a selected constant voltage, and
   charging the rechargeable batteries for a time period greater than a time required for a current in the circuit to be less than or equal to a current passing through the resistance element of any one of the plurality of the assembly.

28. A method for charging the rechargeable batteries of the power supply system of claim 18, comprising
   providing a battery charger in the circuit for charging the plurality of rechargeable batteries at a selected constant current, and
   charging the rechargeable batteries for a time period greater than a time required for a current in the circuit to be less than or equal to a current passing through the resistance element of any one of the plurality of the assembly.

29. A method for charging the rechargeable batteries of the power supply system of claim 18, comprising
   providing a battery charger in the circuit for charging the plurality of rechargeable batteries at a selected constant current followed by a constant voltage, and
   charging the rechargeable batteries for a time period greater than a time required for a current in the circuit to be less than or equal to a current passing through the resistance element of any one of the plurality of the assembly.

30. A method for charging the rechargeable batteries of the power supply system of claim 19, comprising
   providing a battery charger in the circuit for charging the rechargeable batteries at a selected constant voltage, and
   charging the rechargeable batteries for a time period greater than a time required for a current in the circuit to be less than or equal to a current passing through the resistance element of any one of the plurality of the assembly.

31. A method for charging the rechargeable batteries of the power supply system of claim 19, comprising
   providing a battery charger in the circuit for charging the plurality of rechargeable batteries at a selected constant current, and
   charging the rechargeable batteries for a time period greater than a time required for a current in the circuit to be less than or equal to a current passing through the resistance element of any one of the plurality of the assembly.

32. A method for charging the rechargeable batteries of the power supply system of claim 19, comprising
   providing a battery charger in the circuit for charging the plurality of rechargeable batteries at a selected constant current followed by a constant voltage, and
   charging the rechargeable batteries for a time period greater than a time required for a current in the circuit to be less than or equal to a current passing through the resistance element of any one of the plurality of the assembly.

33. A method for charging the rechargeable batteries of the power supply system of claim 20, comprising
   providing a battery charger in the circuit for charging the rechargeable batteries at a selected constant voltage, and
   charging the rechargeable batteries for a time period greater than a time required for a current in the circuit to be less than or equal to a current passing through the resistance element of any one of the plurality of the assembly.

34. A method for charging the rechargeable batteries of the power supply system of claim 20, comprising
   providing a battery charger in the circuit for charging the plurality of rechargeable batteries at a selected constant current, and
   charging the rechargeable batteries for a time period greater than a time required for a current in the circuit to be less than or equal to a current passing through the resistance element of any one of the plurality of the assembly.

35. A method for charging the rechargeable batteries of the power supply system of claim 20, comprising provyidnig a battery charger in the circuit for charging the plurality of rechargeable batteries at a selected constant current followed by a constant voltage, and charging the rechargeable batteries for a time period greater than a time required for a current in the circuit to be less than or equal to a current passing through the resistance element of any one of the plurality of the assembly.

* * * * *